July 13, 1937.    A. F. PLINT ET AL    2,086,678
CONTROL OF AUTOMATIC MILKING APPARATUS
Filed May 27, 1936    3 Sheets-Sheet 1

INVENTORS
Alexander F. Plint,
G. H. Gascoigne, J. R. Knox, & J. A. Kingston
By C. F. Wenderoth
ATTORNEY July 13, 1937.   A. F. PLINT ET AL   2,086,678
CONTROL OF AUTOMATIC MILKING APPARATUS
Filed May 27, 1936   3 Sheets-Sheet 2
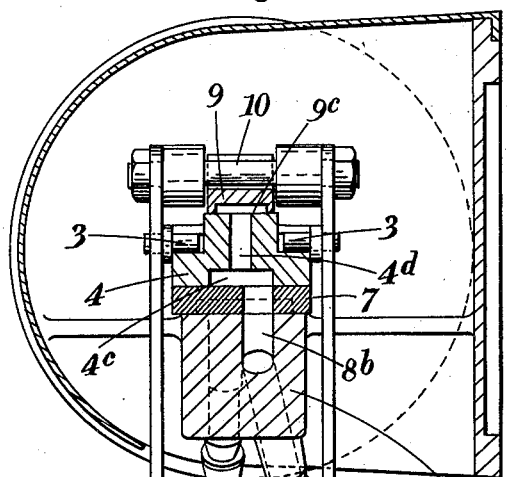
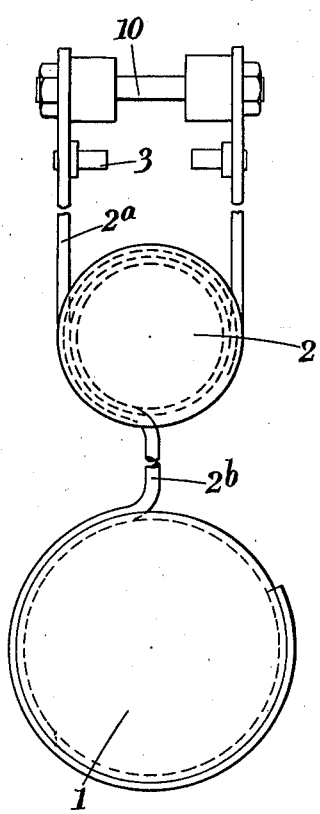
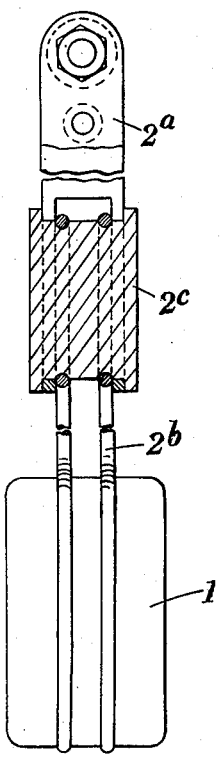
INVENTORS
Alexander F. Plint,
G H Gascoigne, J. R. Knox, & J A Kingston
By E. F. Wenderoth
ATTORNEY Patented July 13, 1937

2,086,678

UNITED STATES PATENT OFFICE 2,086,678

CONTROL OF AUTOMATIC MILKING APPARATUS

Alexander Frederick Plint, Henley-on-Thames, and George Harry Gascoigne, Joseph Rogers Knox, and Jonas Arthur Kingston, Reading, England Application May 27, 1936, Serial No. 82,128
In Great Britain May 21, 1935

12 Claims. (Cl. 31—69)

This invention relates to the control of automatic milking apparatus and has for its chief object to provide improved means for producing and controlling the pneumatic pulsations of reduced pressure on the teat cups of apparatus working on the well known automatic suction principle. The control device of the present invention is, however, applicable to systems in which pulsating pressure above atmospheric is required as well as to systems in which the pulsations are sub-atmospheric and is applicable not only to milking machinery but to machinery generally in which a constant pressure or suction is converted into regular pulsations of pressure or suction. More specifically, an object of the present invention is to provide a control device that is not so delicate as to be thrown out of action by a trifling disorder but is sufficiently robust and powerful to override minor imperfections or irregularities in other parts of the system and to maintain steady pulsations of substantially constant periodicity.

Broadly stated the control device of the present invention comprises essentially a pendulum mounted on movable bearings and co-operating with means for producing the pulsations, in such manner that a movement is imparted to the movable bearings operating to maintain the pendulum in oscillation.

The means for producing the pulsations may comprise a ported or channelled block which is adapted for a reciprocatory movement to apply the pulsations alternately to the respective teat cups and in which are provided the bearings for the pendulum. A valve may be mounted to slide on the block and adapted to be reciprocated by the upper projecting end of the pendulum in its oscillatory movement, the valve serving to control the direction of movement of the block. The block may be reciprocated by means of suction applied under the control of the valve to air chambers situated at either end of the block and connected thereto by pistons or diaphragms forming the end closures of the chambers and in communication therewith through the channels in the block.

In order that the invention may be clearly understood and readily carried into effect we will now describe the same in connection with automatic milking machinery by reference to the accompanying drawings in which:—

Figure 2 is a fragmentary sectional view taken substantially on the line 2—2 of Figure 1.

Figures 10 and 10a are views of a jointed form of pendulum.

Figure 1:
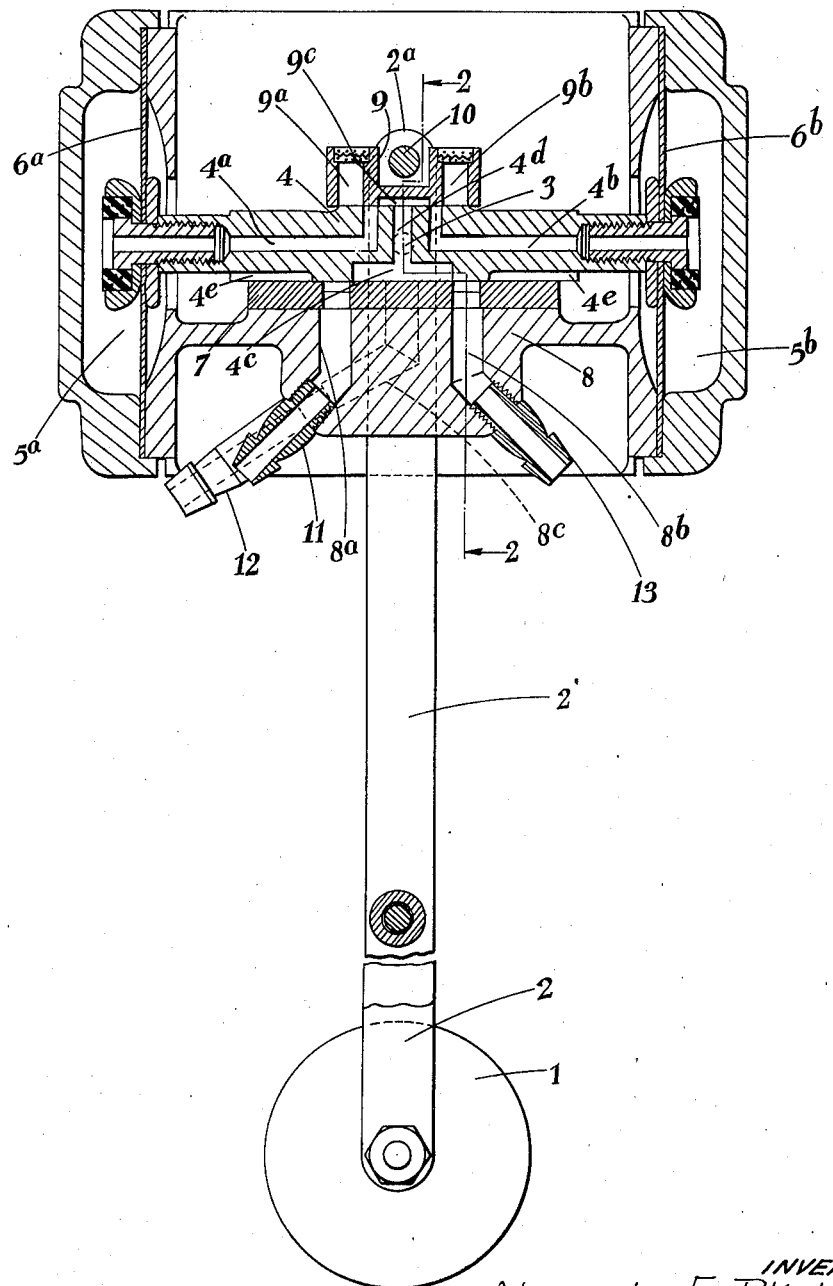
Figure 1 is a sectional view of one embodiment of the invention taken in the plane of oscillation of the pendulum.

In the preferred construction illustrated, the pendulum comprises a bob 1 and a stem composed of two spaced strips 2, 2, carrying inwardly directed trunnions 3, 3, by which the pendulum is pivoted on a channelled and ported block 4. The block 4 is in effect a pair of aligned tubes terminating at their remote ends in diaphragm chambers 5a, 5b, and themselves carrying respectively diaphragms 6a, 6b, peripherally clamped in said chambers. The block 4 is slidable on a base plate 7 on the body 8 of the device. Through the tubular portions of the block are passages 4a, 4b, terminating at their remote ends in the diaphragm chambers and at their adjacent ends in the upper surface of the block. On the underside of the block is a space 4c from which a passage 4d leads to the uppper surface of the block as shown.

The block is surmounted by a slide valve 9 engaged by a cross pin 10 on upward extensions 2a, 2a, of the pendulum strips so that as the pendulum oscillates, the cross pin 10 shifts the slide valve 9 to and fro on the block 4. In the slide 9 are formed two vertical passages 9a, 9b (preferably covered by gauzes) and on the under surface of the slide is a space 9c as shown.

Into the body 8 beneath the base plate 7 are fitted three pipes; the middle one 12 leads on the one hand to a suction pump or equivalent source of vacuum and on the other hand through a passage 8c in the body 8 to the space 4c in the block 4; the two side pipes 11 and 13 are connected on the one hand to teat cups or a teat cup distributor and on the other hand through passages 8a and 8b in the block 8 to the surface of the base plate 7. As the ported or channelled block 4 is reciprocated across the upper face of the base plate 7 it puts the source of vacuum into communication by way of the middle pipe 12 and passage 8c first with one side pipe 11 through its passage 8a and then with the other side pipe 13 through its passage 8b and also puts the side pipes intermittently into communication with the atmosphere through passages 4e on the underside of the block. The pendulum after being set in oscillation would, if ordinarily suspended, tend to come to a standstill, but its trunnions 3, 3, are shifted bodily with the reciprocation of the block 4 and the pendulum is thereby kept in motion. As the pendulum swings the cross pin 10 on the upper extensions 2a, 2a of the pendulum beyond its axis engages with and causes reciprocation of the above-mentioned slide valve 9 across the upper face of the block 4 and thereby puts the source of vacuum by the way of passages 4a, 4b in said block into communication alternately with the two chambers 5a, 5b, at the ends of the tubular portions of the block. As each chamber is subjected to the reduced pressure the other chamber is put into communication with the atmosphere so that the block 4 with its terminal pistons or diaphragms shifts towards the chamber of momentarily reduced pressure. The shifting of the block 4 shifts the axis of suspension of the pendulum thus imparting potential energy thereto and as the pendulum swings back towards the vertical it shifts the slide valve 9 and thereby changes over the reduced pressure from the one chamber to the other whereby the block is again moved and so on.

Figure 3:
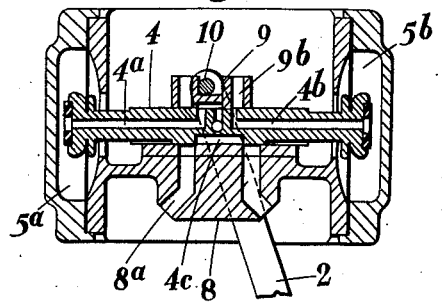
Figures 3 to 9 are a series of sectional views showing a succession of stages in the operation of the device.
Figure 4:
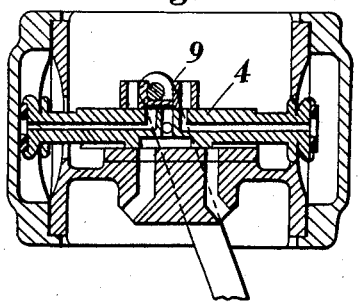

Considering now successive stages of a complete cycle of operations and assuming that the device starts from rest as shown in Figure 1, it is to be observed that the block 4 and the slide valve 9 and the diaphragms 6a 6b are all in their central position. To start the apparatus working the pendulum is tilted, say to the right as in Figure 3. This has the effect of causing the cross pin 10 to shift the slide valve 9 to the left, with the result that a suction acting in the space 4c and up the passage 4d and in the space 9c is applied through the passage 4a with the diaphragm chamber 5a, whilst simultaneously the chamber 5b and passage 4b are put in connection with the atmosphere through the passage 9b. The suction in chamber 5a therefore pulls the block 4 to the left as shown in Figure 4, thereby shifting the position in space of the pendulum trunnions 3, 3 and giving to the latter a small amount of additional energy. The shifting of the block 4 also causes the suction pipe 12 to be put into communication with the teat suction pipe 11 by way of the passage 8a, the space 4c and the passage 8c.

Figure 5:
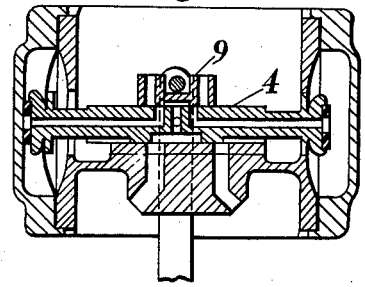
Figure 6:
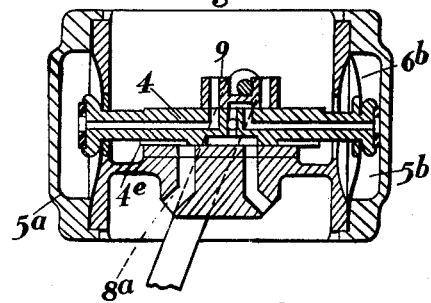

As the pendulum swings back it reaches the vertical position, thereby shifting the slide valve 9 as shown in Figure 5, and it then swings to the left as shown in Figure 6 shifting the slide valve 9 to the right and thereby causes the suction to be transferred from chamber 5a to chamber 5b and simultaneously puts the chamber 5a into communication with the atmosphere. The diaphragm 6b in the chamber 5b pulls the block 4 to the right as shown in Figure 6, with the result that the suction is transferred from the teat suction pipe 11 to the teat suction pipe 13, and simultaneously the pipe 11 is put into communication with the atmosphere by way of the passage 8a, and the passage 4c. The shifting of the block 4 also bodily shifts the trunnion 3 of the pendulum and imparts additional energy to the pendulum.

Figure 7:
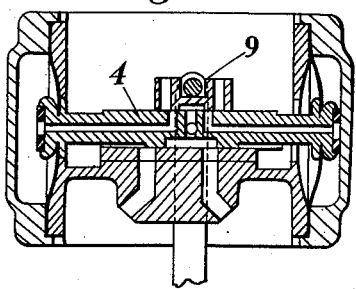
Figure 8:
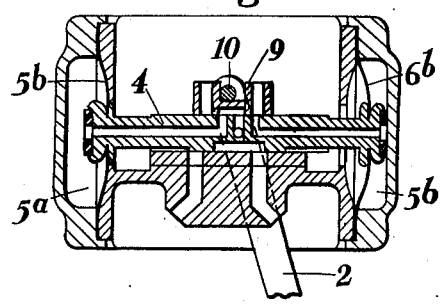
Figure 9:
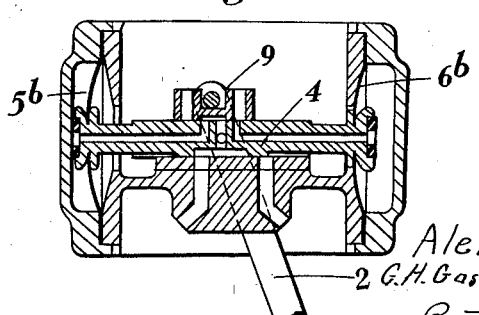

The pendulum then swings back again, first reaching the position shown in Figure 7, in which the slide valve 9 only has been moved; but then reaching the position shown in Figure 8, in which the disposition of ports to the chambers 5a, 5b is changed over. The diaphragms 6a, 6b are therefore affected, causing the block 4 to be shifted (taking with it the slide valve 9) as shown in Figure 9, which is identical with Figure 4.

It is to be observed that the reduced pressure of the milking system is also the sole driving force of the above described control device and that the periodicity of the device is constant because it is dependent upon the oscillations of a pendulum the time period of which is, as is known, independent of its amplitude, provided the amplitude is not large, and readily regulated by altering its length.

The stroke of reciprocation of the block 4 may be set by limiting the extent of movement of the diaphragms 6a, 6b with respect to their chambers.

It will be understood that although the preferred embodiment of the present invention has been described and illustrated various constructional modifications of detail may be resorted to. For instance equivalent effects may be realized by a construction in which a ported member performs an arcuate to and fro movement instead of rectilinear one. In particular, a detail of modified construction is shown in Figures 10 and 10a. It will be understood that if there is slackness or play in the mounting of the pendulum at the trunnions 3, 3, the pendulum may tend to develop a slight lateral movement as well as a vertical planar movement. In order to counteract such an effect without having to make a very accurate trunnion mounting, we may articulate the pendulum as shown in Figures 10 and 10a, where it is seen to comprise an upper portion 2a mounted on trunnions 3, 3, as in Figure 2, and a lower portion 2b rockably suspended from a reel 2c serving as a joint pin. It is to be observed that the axis of the reel 2c is in a plane at right angles to the plane containing the axis of the trunnions 3, 3, so that the pendulum bob 1 can retain its plane of oscillation even if the trunnions 3, 3, shift axially to a slight extent.

What we claim is:—

1. A periodicity controlling device for apparatus operating by pressure pulsations comprising a ported and channelled block, a pendulum suspended from said block, and pressure actuated means operating through said block for intermittently shifting the axis of suspension of said pendulum, said pendulum controlling the pulsations by its to and fro motion.

2. A periodicity controlling device for apparatus operating by pressure pulsations comprising a ported and channelled block, a pendulum suspended from said block, said block being moved bodily to effect intermittent shifting of the axis of suspension of said pendulum, a pair of aligned tubes provided in said block, diaphragms at the outer ends of said tubes, and pressure chambers served by said diaphragms as movable closures, said pressure chambers being subjected alternately to reduced and atmospheric pressures, and said pendulum serving to control the pulsations by its to and fro motion.

3. A device according to claim 2 also comprising a movable valve located in said block and actuated by said pendulum, said valve serving to control the alternative pressures in said pressure chambers.

4. A device according to claim 2 also comprising a movable valve located in said block, and an upwardly extending member integral with said pendulum and projecting above the axis of suspension of said pendulum, said valve being operated by engagement with said upwardly extending member.

5. A periodicity controlling device comprising a pendulum, a ported and channelled block, and trunnions mounted on said block, said pendulum being suspended from said block by said trunnions, said pendulum having two sections of which the upper section is provided with said trunnions, and the lower section of said pendulum being pivotally suspended from said upper section about an axis in a plane perpendicular to the plane containing the axis of said trunnions.

6. In apparatus such as automatic milking machines operating by pressure pulsations, means for producing the pulsations, and a pendulum controlling the periodicity of the pulsations, the pulsation-producing means cooperating with the pendulum to shift the axis of suspension of the pendulum intermittently to maintain the pendulum in oscillation.

7. In apparatus such as automatic milking machines operating by pressure pulsations, a ported and channelled block, means for intermittently reciprocating said block, and a pendulum suspended from the block and controlling the periodicity of the pulsations, the movements of the block shifting the axis of suspension of the pendulum to maintain the pendulum in oscillation.

8. In automatic milking machines employing teat cups operating by pressure pulsations, a ported and channelled block means for reciprocating said block to put the teat cups alternately into communication with the atmosphere and the source of reduced pressure, and a pendulum suspended from the block and controlling the periodicity of the pulsations, the reciprocating movement of the block serving to shift the axis of suspension of the pendulum to maintain the latter in oscillation.

9. In apparatus, such as automatic milking machines, operating by pressure pulsations, a ported and channelled block, a valve mounted to slide on the block, a pendulum suspended from the block, means interconnecting the pendulum with the valve to reciprocate said valve, and pressure responsive means controlled by said valve to reciprocate said block, the movement of the block shifting the axis of suspension of the pendulum to maintain the latter in oscillation.

10. In apparatus, such as automatic milking machines, operating by pressure pulsations, a ported and channelled block, pistons or diaphragms secured on the ends of the block, pressure chambers positioned to either side of the block and closed by said pistons or diaphragms, a valve mounted to slide on the block, a pendulum suspended from the block, and means interconnecting the pendulum with the valve to reciprocate said valve, the movement of the block shifting the axis of suspension of the pendulum and maintaining the pendulum in oscillation, and the combined movements of the block and the valve producing alternately reduced pressure and atmospheric pressure in said pressure chambers.

11. In apparatus such as automatic milking machines operating by pressure pulsations, a ported and channelled block, means for intermittently reciprocating said block and a two-part pendulum controlling the periodicity of the pulsations, the upper part being suspended in bearings from the block and the lower part being pivotally suspended from the upper part about an axis in a plane at right angles to the plane containing the bearing axis of the upper part, the movements of the block shifting the axis of suspension of the pendulum to maintain the pendulum in oscillation.

12. In apparatus such as automatic milking machines operating by pressure pulsations, a casing, a base plate in said casing, channels in said base plate in communication with the teat cups, a ported and channeled block sliding on said base plate, pistons or diaphragms secured at the ends of said block, pressure chambers positioned at either side of said casing and closed by said pistons or diaphragms, a slide valve mounted on said block, a pendulum suspended from said block, and means interconnecting the pendulum with said valve, the pendulum through said valve controlling the alternate reduced and atmospheric pressure through said block to said pressure chambers for reciprocating said block and for applying suction through the channelled base plate alternately to the teat cups, and the movement of said block by shifting the axis of suspension of the pendulum maintaining the latter in oscillation.

ALEXANDER FREDERICK PLINT.
GEORGE HARRY GASCOIGNE.
JOSEPH ROGERS KNOX.
JONAS ARTHUR KINGSTON.